United States Patent [19]

Cox et al.

[11] Patent Number: 4,859,327
[45] Date of Patent: Aug. 22, 1989

[54] MEANS FOR WATER AND WASTEWATER TREATMENT

[76] Inventors: Raleigh L. Cox, 15582 Summerwood Dr., Baton Rouge, La. 70817; Christopher E. Cox, 2657 Palmer Rd., Baton Rouge, La. 70816

[21] Appl. No.: 134,933

[22] Filed: Dec. 18, 1987

[51] Int. Cl.⁴ ............................................. B01D 35/06
[52] U.S. Cl. ..................................... 210/219; 210/220
[58] Field of Search ............... 210/219, 202, 220, 519, 210/523, 721, 738, 926, 723, 609, 626, 629

[56] References Cited

U.S. PATENT DOCUMENTS

| | | | |
|---|---|---|---|
| 1,122,156 | 12/1914 | Pratt | 210/609 |
| 1,793,510 | 2/1931 | Raymond | 210/519 |
| 2,289,669 | 7/1942 | Maxton | 210/738 |
| 2,678,912 | 5/1954 | Kalinske et al. | 210/220 |
| 4,362,625 | 12/1982 | Beard | 210/926 |
| 4,383,922 | 5/1983 | Beard | 210/926 |
| 4,443,338 | 4/1984 | Reid | 210/926 |
| 4,457,844 | 7/1984 | Beard | 210/624 |
| 4,487,692 | 12/1984 | Kersten | 210/219 |
| 4,608,157 | 8/1986 | Graves | 210/202 |

FOREIGN PATENT DOCUMENTS 1497043 1/1978 United Kingdom ............... 210/926

Primary Examiner—Bernard Nozick
Attorney, Agent, or Firm—Robert C. Tucker; William David Kiesel; Timothy J. Monahan

[57] ABSTRACT

A treatment system for water or wastewater is provided, comprising a tank having a substantially circular continuous sidewall and a bottom; a mixing device, for mixing and circulating liquid within the tank, positioned within the tank; and an intra-channel clarifier, positioned within the tank between the center of the tank and the sidewall such that the clarifier will be partially submerged when the tank contains liquid, the clarifier including a bow, a stern, side walls, an entry opening and at least one discharge port in the bottom, the clarifier having an elongated shape such that the side walls are generally parallel to the sidewall of the tank.

8 Claims, 3 Drawing Sheets

MEANS FOR WATER AND WASTEWATER TREATMENT

BACKGROUND OF THE INVENTION

1. Field of the Invention.

This invention relates generally to apparatus and processes for water and wastewater treatment and, more particularly, to such apparatus and processes which employ intra-channel clarification.

2. Prior Art.

Various processes are employed to treat sewage, as well as water for drinking. Some employ very large and complex pieces of equipment, and are utilized in situations involving significant volumes of influent to be treated. Other processes are accomplished on a much smaller scale. Plants employing small scale treatment processes are often referred to as "package plants", due to the ability to package and ship an entire plant as a unit. In sewage treatment, such plants are used to treat a single residential subdivision or single commercial application without the necessity of transmitting sewage to a large central treatment site. The same is true in water treatment, where small water systems cannot justify large treatment operations.

A common package sewage treatment plant employes a circular tank containing aeration equipment. Influent sewage is aerated in the tank. In a settling chamber, aerated floc is allowed to settle out and is returned to the tank, usually by pumping. Clarified water is skimmed from the settling chamber and is removed from the tank by either gravity flow or pumping.

In a package water treatment plant, the process is similar. Untreated water is pumped into a circular tank where a flocculant is added, causing solid particules in the water to coalesce. The water is mixed to encourage full utilization of the flocculant. In a settling chamber, the floc is allowed to settle and clarified water is skimmed and removed.

The efficiency of package sewage treatment plants has been questioned, as has the energy consumption of such plants. With increasing effluent quality standards, a need has developed for a more efficient plant which will function adequately under peak loading conditions while consuming a minimum amount of energy. Grit removal is also a problem which must be addressed, since small scale plants accumulate grit (such as sand) just as do large scale plants.

Various types of aerobic treatment methods are employed in large scale sewage treatment plants. One method which has proven to be highly successful utilizes an oxidation ditch for sewage aeration, whereby a flow of aerated sewage is continuously circulated in a generally oval-shaped ditch. Clarification of the aerated sewage is accomplished in various ways. Some plants use external clarifiers, which are large tanks into which mixed liquor from the oxidation ditch is pumped. Sludge floc is allowed to settle and is pumped back into the ditch for further aeration. Clarified effluent is drawn off the top of the external clarifier. The external clarifier process is very similar to that used in the prior art package plants.

A relatively new technology has developed whereby clarification takes place within the oxidation ditch itself. This technology is known as "intra-channel clarification". Various types of intra-channel clarifiers are disclosed by way of example in the following U.S. patents:

| U.S. Pat. No. | Inventor |
| --- | --- |
| 4,362,625 | Beard |
| 4,383,922 | Beard |
| 4,457,844 | Beard |

Applicant has utilized the principles of intra-channel clarification to develop a treatment system having the advantages of oxidation ditch efficiency and package plant utility. Applicant's invention is likewise useful for water treatment.

SUMMARY OF THE INVENTION

Therefore, it is an object of this invention to provide a means and method for water and wastewater treatment which may be utilized in a substantially round tank, and in which water or wastewater may be treated and clarified within the tank.

It is another object of this invention to provide a means and method for water and wastewater treatment which utilizes the flow dynamics of an aeration process to accomplish clarification in a substantially round tank.

It is another object of this invention to provide a means and method for water and wastewater treatment which provides a more reliable treatment method than existing package plant technology.

It is still another object of this invention to provide a means and method for water and wastewater treatment which provides a means for grit removal.

It is a further object of this invention to accomplish all of the above objectives in combinations.

Accordingly, a treatment system for water or wastewater is provided, comprising a tank, having a substantially circular continuous sidewall and a bottom; a mixing device, for mixing and circulating liquid within the tank, positioned within the tank; and an intra-channel clarifier, positioned within the tank between the center of the tank and the sidewall such that the clarifier will be partially submerged when the tank contains liquid, the clarifier including a bow, a stern, side walls, an entry opening and at least one discharge port in the bottom, the clarifier having an elongated shape such that the side walls are generally parallel to the sidewall of the tank.

DETAILED DESCRIPTION OF PREFERRED EMBODIMENTS OF THE INVENTION

Sewage Treatment

Figure 1:
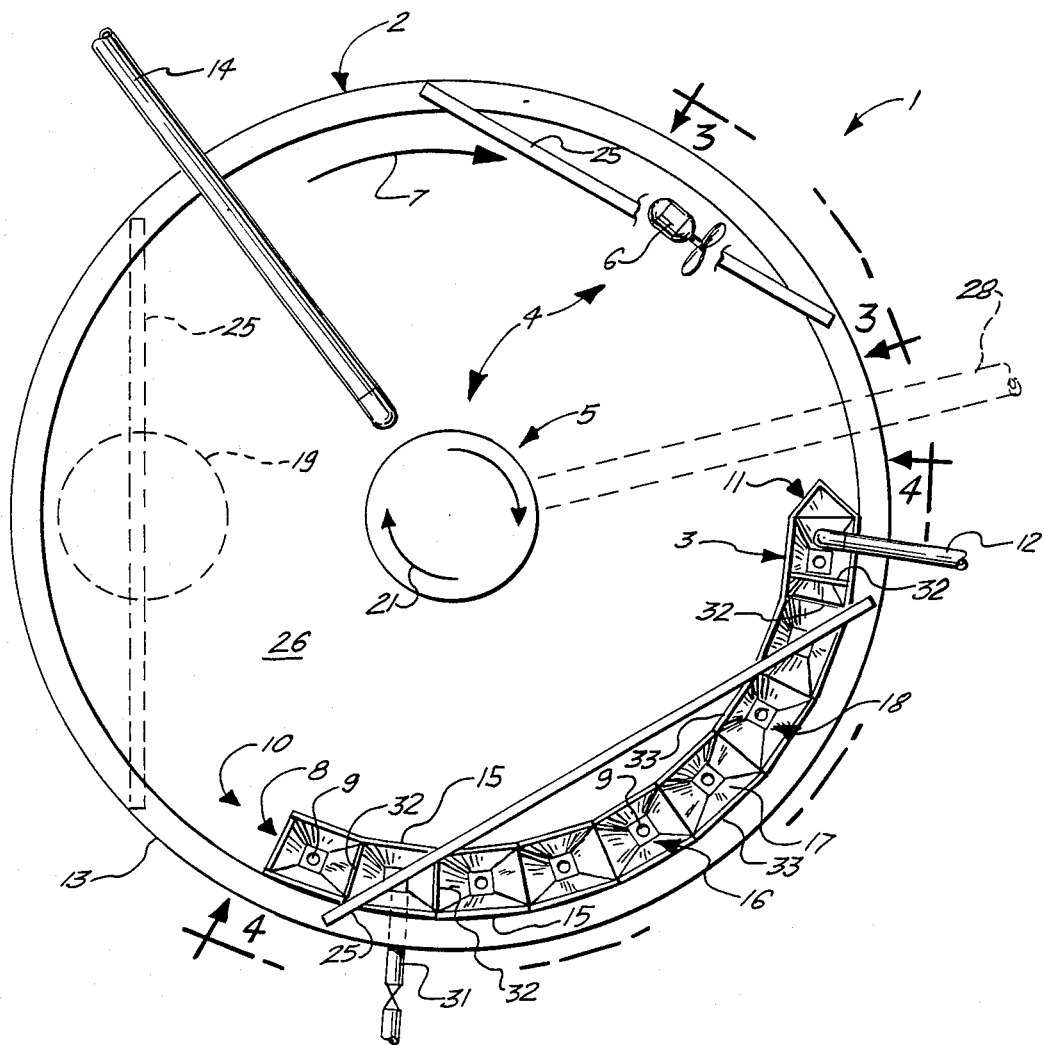
FIG. 1 is a plan view of a preferred embodiment of the treatment system of the invention.

As shown in FIG. 1, the treatment system 1 generally comprises a substantially circular tank 2, an intra-channel clarifier 3 and a mixing means 4. In the embodiment shown in FIG. 1, mixing means 4 comprises both aerator 5 and propeller mixer 6. A single mixing means 4 could be utilized, if desired. Sewage enters the system 1 via inlet piping 14. Mixing means 4 mixes and circulates mixed liquor in tank 2 causing oxidized sewage to flocculate, and creating a circular flow represented by flow arrow 7. As the mixed liquor flows under and around clarifier 3 (with bow 11 oriented in an upstream direction), the resultant head losses establish a flow diverting a portion of the mixed liquor into clarifier 3 via entry opening 8 in stern 10. Settlement of sludge (floc) is accelerated in clarifier 3 by flow through at least one port 9, drawing the sludge downward to ports 9 and back into tank 2. As mixed liquor within clarifier 3 moves from stern 10 toward bow 11, the liquid is separated into a clarified phase in the upper regions of clarifier 3, and a sludge phase in the lower regions of clarifier 3, near ports 9. The clarified phase is withdrawn from bow 11 by discharge piping 12. Discharge piping 12 may exit the system 1 as shown or may exit through bottom 26 or sidewall 13. Various elements of structure may be supported as shown by beams 25 or other suitable means. Aerator 5 may be supported by beams 25 (not shown) or aerator supports 29 or other suitable means.

Figure 3:
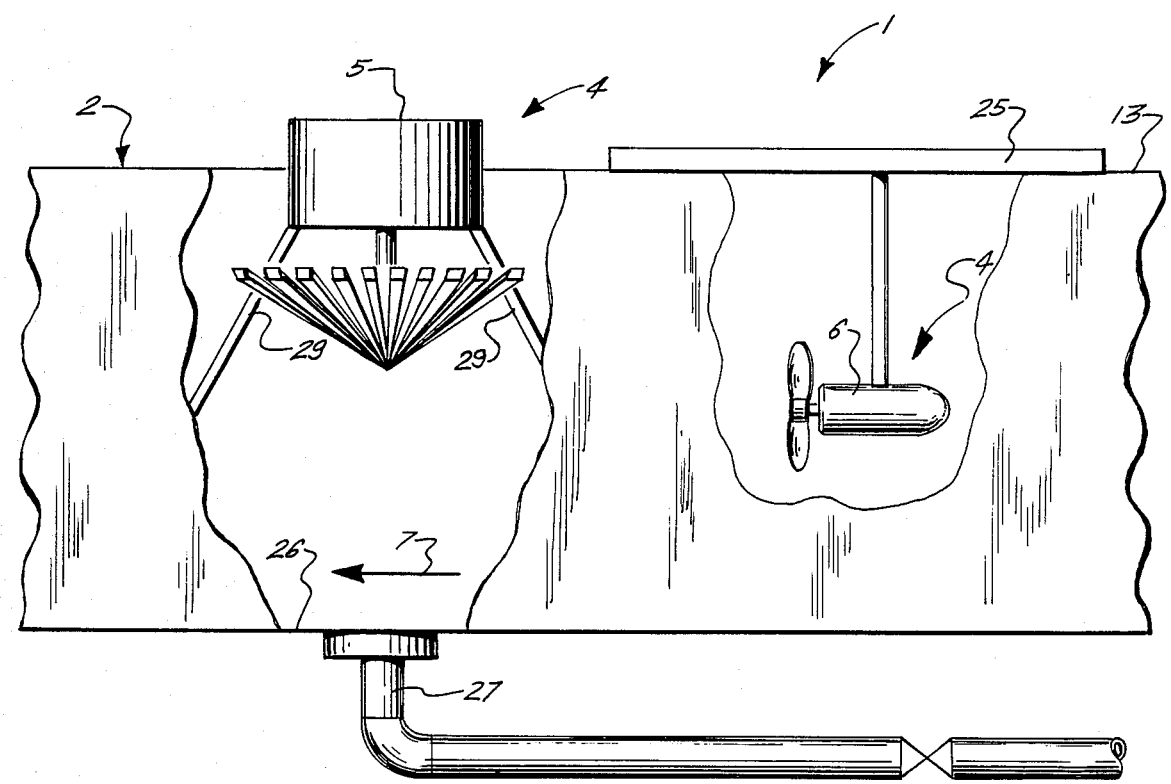
FIG. 3 is a side view of a preferred embodiment of the invention, taken along view line 3—3 of FIG. 1, with the tank sidewall partially removed and sidewall curvature straightened for clarity.

Clarifier 3 is constructed generally parallel to the substantially circular tank sidewall 13. Thus, clarifier 3 takes an elongated, curved shape rather than that of traditional straight clarifiers, which are normally installed in the straight portion of an oxidation ditch channel. The curved shape of clarifier 3 allows full utilization of the circular flow components established by mixing means 4. The term "curved", as used herein means generally curved in a parallel relationship within sidewall 13. For example, clarifier 3 may comprise a series of straight sections 33, angled so as to be generally parallel to sidewall 13, as shown in FIG. 1. It is preferable that clarifier 3 be located just inside tank sidewall 4, to take full advantage of the stable circular flow around the perimeter of tank 2. As shown in FIG. 1 and 3, clarifier 3 comprises side walls 15, bottom 16, stern 10, bow 11, ports 9 and entry opening 8.

Although one preferred embodiment of clarifier 3 is shown in the figures, any conventional intra-channel clarifier may be modified to conform to the curved shape described above. For example, a single, elongated row of ports 9 is shown in the Figures. However, each port 9 shown may be expanded to a row of ports 9 running perpendicular to the length of clarifier 3, as shown in the prior art patents previously cited. Bottom 16 may comprise sloping walls 17 which, in turn, comprise hoppers 18 which serve to direct the sludge phase to ports 9. By locating entry opening 8 in stern 10, advantage is taken of low stream velocity at this point, encouraging smooth, laminar flow into clarifier 3. Laminar flow and separation into sludge and clarified phases may be further encouraged by the addition of baffles 32, between side walls 15. Ports 9 may be enhanced by the addition of beveled extension tubes 20, which increase the efficiency of the suction action through ports 9.

Waste sludge may be removed from the system 1 through sludge waste line 31.

Figure 4:
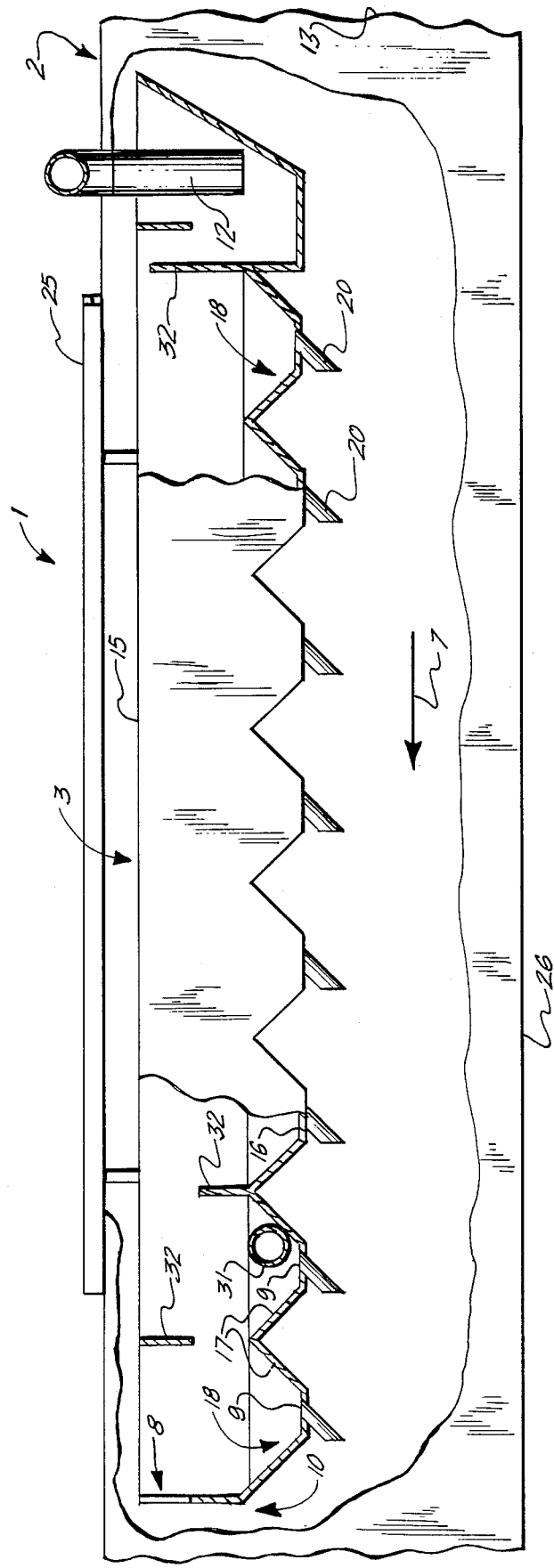
FIG. 4 is a side view of a preferred embodiment of the invention taken along view line 4—4 of FIG. 1, with the tank sidewall partially removed and sidewall curvature straightened for clarity. Portions of the clarifier are shown in section for clarity.

In aerobic sewage treatment plants it is imperative to maintain high oxygen levels in the mixed liquor. Also, in order to assure proper circulation velocity (preferably one foot per second) a strong circular current must be maintained. Therefore, if a single device is utilized for a mixing means 4, it must accomplish both of the above objectives. In order to assure proper performance it is preferred, as stated above, that mixing means 4 include an aeration means, such as aerator 5 rotating about a vertical axis (see FIG. 4) and an additional circulation device such as a prop mixer 6. Other mixing means 4 may be utilized, including aeration means such as diffusers, brush aerators and other devices known in the art. Aerator 5 may be located in the center of tank 2 or may be offset between the center of tank 2 and sidewall 13, such as shown by alternate location 19. It is preferable that propeller mixer 6 be located near the periphery of tank 2 in order to maintain the desired velocity around and under clarifier 3.

Figure 2:
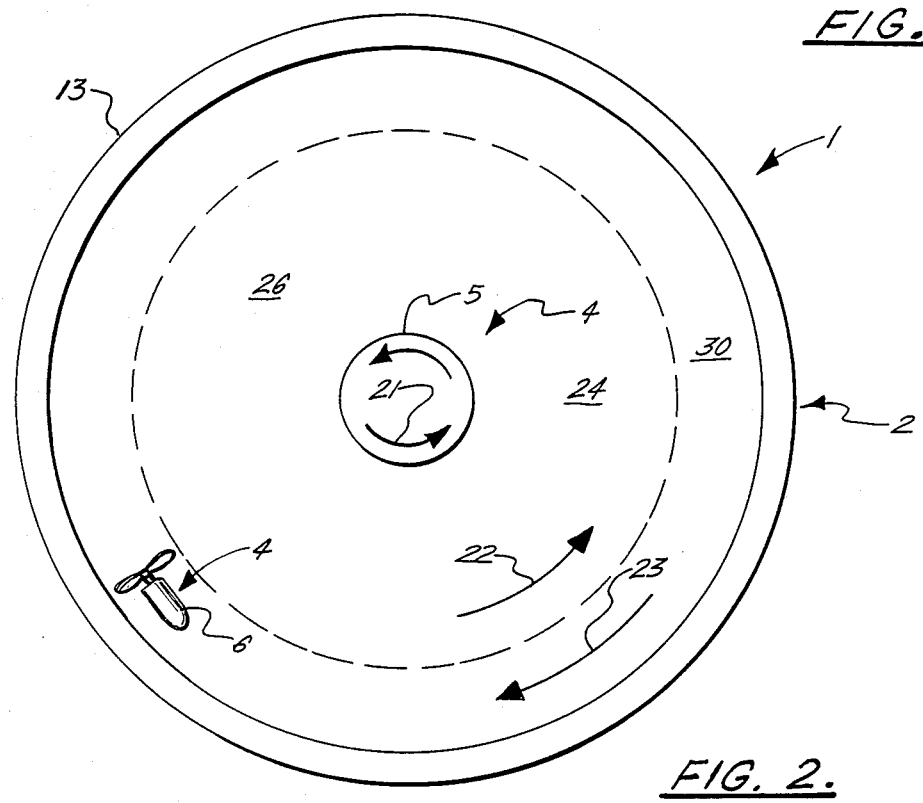
FIG. 2 is a plan view of another preferred embodiment of the treatment system of the invention, with the clarifier removed for clarity.

In FIG. 2, an alternate treatment scheme is disclosed. Clarifier 3 has been omitted for clarity. Aerator 5 is positioned in the central portion of tank 2 (possibly offset from center), and is configured to rotate in the direction shown by rotation arrows 21, establishing an interior flow in the direction shown by flow arrow 22. Prop mixer 6, or any other suitable means for establishing flow, is positioned as shown so as to establish an outer flow, shown by flow arrow 23, in the opposite direction from the interior flow. Such an arrangement allows for more efficient aeration in an aerated zone 24 and more laminar flow in a non-aerated zone 30, encouraging efficient clarification.

It should be understood that the term "substantially circular" includes tank configurations which are not totally circular. However, the majority of the perimeter of tank 2 should be circular in shape. For example, an oval configuration having very short straight sections would tend to allow a generally circular current to be established. It is preferred, however, that a circular sidewall 13 be utilized to encourage continuous circular flow.

It has been found that the action of aerator 5 will cause grit to accumulate in a concentrated area in the central portion of tank 2 on the floor 26. Grit can be removed by grit drain 27 and removal line 28. Grit could also be removed from a line (not shown) entering the top or side of tank 2.

Water Treatment

In water treatment applications, a very similar configuration to that of the sewage treatment embodiment described above may be utilized. Untreated water enters the system via inlet piping 14. A flocculation agent is added to the water and is mixed utilizing mixing means 4. Clarification is accomplished as described above, with a thickened floc phase (similar to sludge phase) being removed through ports 9 in clarifier 3 and a clarified phase removed through discharge piping 12. Waste line 31 could be used to remove excess floc.

As can be seen, a clarification system is provided which may be packaged with a circular tank. No external clarification means is necessary, and the system utilizes mixing energy and flow to encourage clarification. The system may be used in municipal or industrial water and waste treatment applications. Applications for the systems described herein include package plant usages. However, treatment systems for very large plants could also incorporate the instant technology. Other embodiments of the invention will occur to those skilled in the art, and are intended to be included within the scope and spirit of the following claims.

I claim:

1. A treatment system for water or wastewater, comprising:
   a. a tank, having a substantially circular continuous sidewall and a bottom;
   b. a mixing means, for mixing and circumferentially circulating liquid within said tank, positioned within said tank; and
   c. an intra-channel clarifier, positioned within said tank between the center of said tank and said sidewall such that said clarifier will be partially submerged when said tank contains liquid, said clarifier including a bow, a stern, a bottom, side walls, an entry opening in said stern, at least one discharge port in said bottom, and a clarified liquid discharge means, connected between said clarifier and a point exterior to said tank, for discharging clarified liquid from said clarifier, said clarifier having an elongated arcuate shape such that said side walls are generally parallel to said circular sidewall of said tank, said bow being oriented in an upstream direction.

2. A treatment system for water and wastewater according to claim 1, wherein said clarifier is positioned just inside said sidewall of said tank.

3. A treatment system for water or wastewater according to claim 1, wherein said mixing means is centrally positioned in said tank.

4. A treatment system for water or wastewater according to claim 3, further comprising a means, for removing grit from said tank, positioned in said bottom under said mixing means.

5. A treatment system for water or wastewater according to claim 1, wherein said mixing means includes an aeration means, for introducing air into liquid in said tank, and a propelling means, for circulating liquid within said tank.

6. A treatment system for water or wastewater according to claim 5, wherein said propelling means comprises a propeller mixer.

7. A treatment system for water or wastewater according to claim 5, wherein said aeration means comprises an aerator rotating about a vertical axis.

8. A treatment system for water or wastewater according to claim 7, wherein said aerator is centrally positioned in said tank and said propelling means is positioned in the outer periphery of said tank and is oriented so as to circulate liquid in the opposite direction from said aerator.

* * * * *